United States Patent [19]

Daniels

[11] Patent Number: 4,821,369
[45] Date of Patent: Apr. 18, 1989

[54] CASTORS BRAKED EITHER IN RESPONSE TO A LOAD OR TO THE ABSENCE OF A LOAD

[75] Inventor: Raymond R. J. Daniels, Norfolk, England

[73] Assignee: Guy-Raymond Engineering Company Ltd., Norfolk, England

[21] Appl. No.: 65,369

[22] Filed: Jun. 23, 1987

[30] Foreign Application Priority Data

Sep. 16, 1986 [GB] United Kingdom ............... 8622236

[51] Int. Cl.$^4$ ............................................. B60B 33/00
[52] U.S. Cl. ......................................... 16/35 R; 16/44; 16/DIG. 27; 16/DIG. 34; 188/1.12
[58] Field of Search ............... 16/35 R, 44, DIG. 34, 16/DIG. 27; 188/1.12, 76, 84, 74

[56] References Cited

U.S. PATENT DOCUMENTS

| 2,942,290 | 6/1960 | Segal | 16/35 R |
|---|---|---|---|
| 3,735,838 | 5/1973 | Greenleaf | 16/35 R |
| 3,914,821 | 10/1975 | Screen | 16/35 R |
| 4,455,707 | 6/1984 | Screen | 16/35 R |

FOREIGN PATENT DOCUMENTS

| 2643551 | 12/1977 | Fed. Rep. of Germany | 16/35 R |
|---|---|---|---|
| 2636542 | 2/1978 | Fed. Rep. of Germany | 16/35 R |
| 2656022 | 6/1978 | Fed. Rep. of Germany | 16/35 R |
| 3131475 | 4/1983 | Fed. Rep. of Germany | 16/35 R |
| 1506584 | 4/1978 | United Kingdom | 16/35 R |
| 2127287 | 4/1984 | United Kingdom | 16/35 R |

Primary Examiner—Fred Silverberg
Assistant Examiner—Edward A. Brown
Attorney, Agent, or Firm—Cooper & Dunham

[57] ABSTRACT

A castor comprises a castor body (12), a castor wheel (14), and a bearing block (20) for supporting the castor wheel relative to the castor body. The bearing block is selectively mountable in each of a first and a second orientation relative to the castor body. In the first orientation of the bearing block relative to the castor body, the castor wheel is arranged to be braked in response to the application of a load applied to the castor. In the second orientation of the bearing block relative to the castor body, the castor wheel is arranged to be braked in the absence of a load applied to the castor.

12 Claims, 6 Drawing Sheets

CASTORS BRAKED EITHER IN RESPONSE TO A LOAD OR TO THE ABSENCE OF A LOAD

BACKGROUND OF THE INVENTION

This invention concerns castors for use on furniture and in particular on office chairs.

In various countries, standards have been laid down regulating certain features of the construction of castors which are available on the market. For example, in some countries, the regulations require that a chair castor be braked only when a load is applied to the castor as a result of a person sitting on the chair to which the castor is attached. In other countries, by contrast, the regulations require that the castor normally be braked and the braking effect removed when a load is applied to the castor as a result of a person sitting in the chair.

Consequently, the design requirements for different countries are not the same, and hitherto it has been necessary to design different castors to suit the different requirements. This is inconvenient and costly.

SUMMARY OF THE INVENTION

The present invention is concerned with the problem of providing a castor which is so designed that it can be selectively adapted to meet either of the above requirements.

According to the present invention, there is provided a castor having a castor body, a castor wheel mounted on the body, and means by which the castor wheel can be selectively braked either in response to the application of a load applied to the castor or in response to the absence of such a load.

A preferred embodiment of the invention features a castor which can be assembled selectively such that the braking is achieved either in response to the application of a load applied to the castor or in response to the absence of such a load.

A significant advantage of the invention is that the same parts can be used for a castor for all the different countries, which enables substantial savings to be made in terms of the machinery required for producing the parts of the castor.

The invention also provides a castor comprising a castor body, a castor wheel, and a bearing block for supporting the castor wheel relative to the castor body, the bearing block being selectively mountable in each of a first and a second orientation relative to the castor body and being arranged, in the first orientation, to support the castor wheel relative to the castor body such that the castor wheel is braked in response to the application of a load applied to the castor and, in the second orientation, to support the castor wheel relative to the castor body such that the castor wheel is braked in response to the absence of such a load.

For example, in the first orientation of the bearing block, the parts of the castor may be arranged so that the castor body and the castor wheel are relatively movable from a first condition in which the castor wheel is freely rotatable to a second condition in which the castor wheel is braked by a first braking surface portion of the castor body and, in the second orientation of the bearing block, the parts of the castor may be arranged such that the castor body and the castor wheel are relatively movable from a first condition in which the castor wheel is braked by a second braking surface portion of the castor body to a second condition in which the castor wheel is freely rotatable.

Preferably, the bearing block supports an axle of the castor which in a bore therein, and the bore is offset relative to the centre of the bearing block whereby the orientation of the bearing block relative to the castor body affects the location of the castor wheel relative to the first and second braking surface portions of the castor body.

The bearing block may be mounted within a cavity within the castor body that is sized to permit relative movement between the castor body and the bearing block to an extent and/or in a direction determined by the orientation of the bearing block within the cavity.

Resilient biasing means are advantageously provided between the castor body and the axle of the castor wheel.

In the preferred embodiment, the first and second braking surface portions of the castor body comprise surfaces on opposed elements of the castor body, and a portion of the castor wheel is disposed between the two elements to engage the elements, respectively, for braking purposes.

The invention is described further, by way of example, with reference to the accompanying drawings, in which:

DESCRIPTION OF THE PREFERRED EMBODIMENTS

Figure 1:
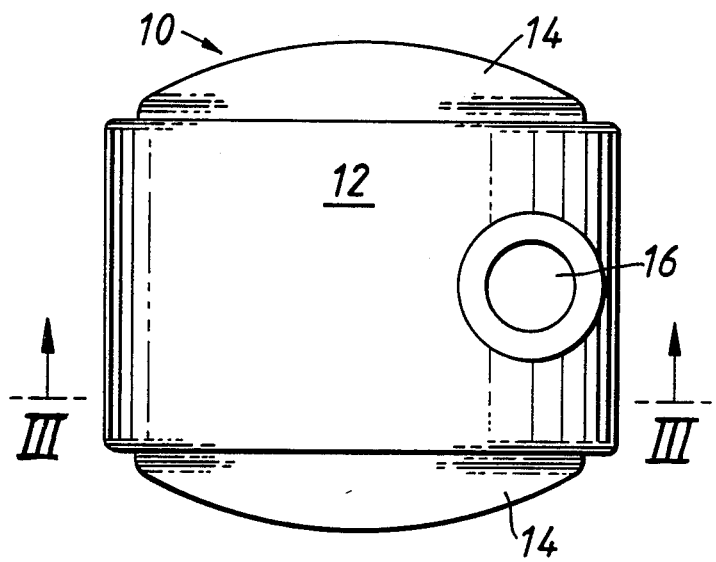
FIG. 1 is a plan view of a castor embodying the invention.
Figure 2:
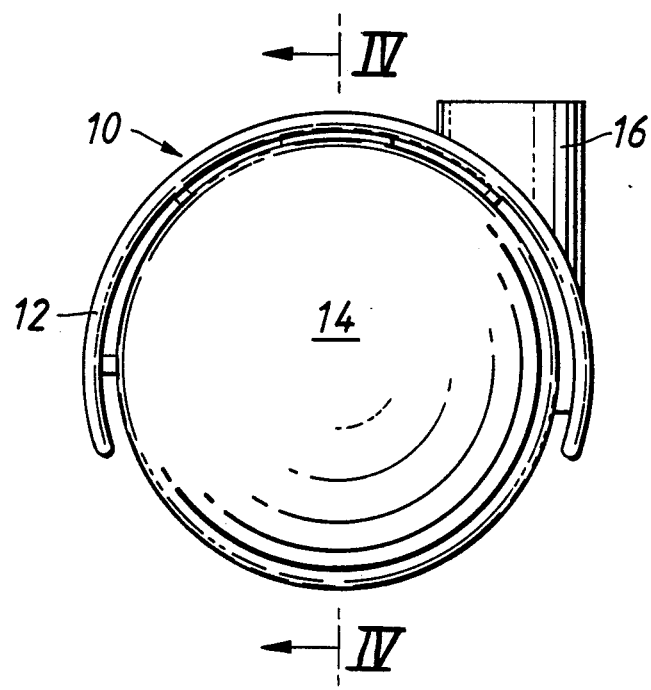
FIG. 2 is a side view of the castor shown in FIG. 1.

Referring to the drawings, a twin wheel castor 10 comprises a castor body 12 and castor wheels 14.

Figure 8:
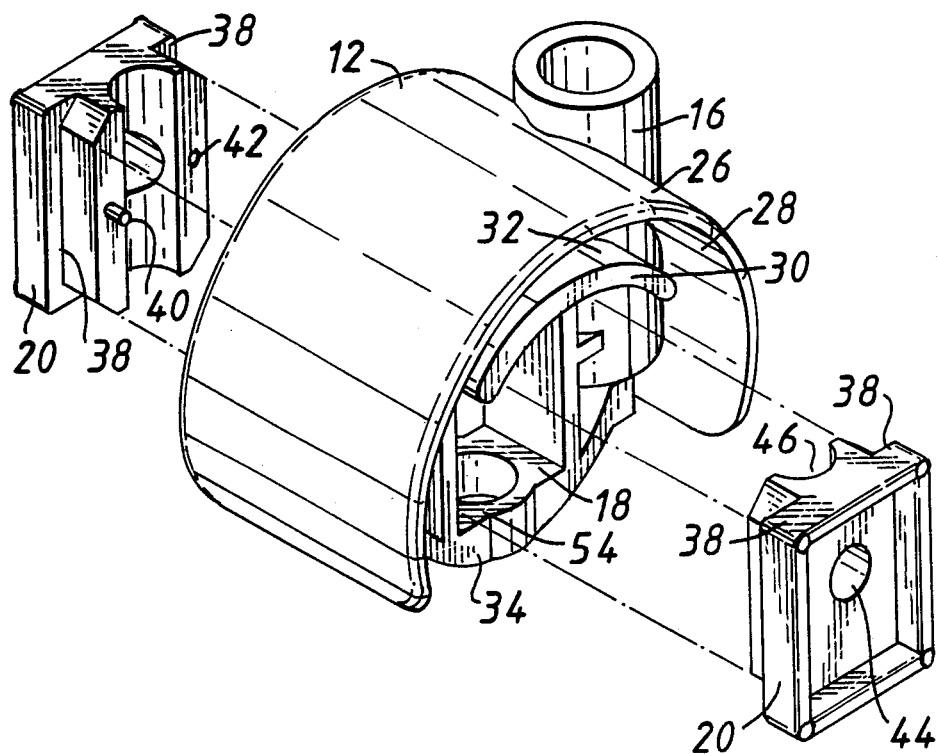
FIG. 8 is an exploded view of the bearing block and the castor body illustrating how the bearing block is mounted on the castor body.
Figure 9:
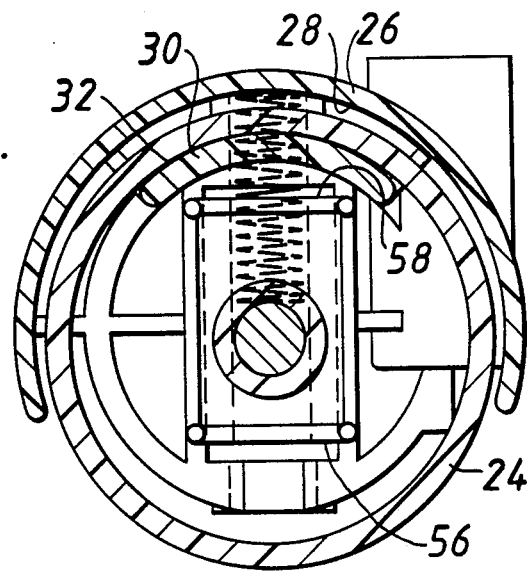
FIG. 9 is a view similar to FIG. 3 but showing the parts of the castor assembled in a second relative orientation.
Figure 10:
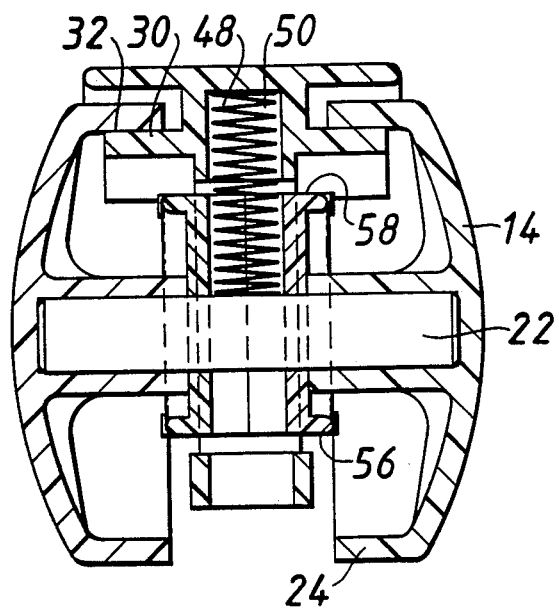
FIG. 10 is a view similar to FIG. 4 showing the parts of the castor assembled in the second relative orientation.

The castor body 12 is formed with a socket 16 for receiving a spigot attached to a piece of furniture for mounting the castor for swivelling movement relative to the piece of furniture. The castor body 12 is also formed with a cavity 18 (see FIG. 8) in which is received a bearing block 20 for supporting the castor wheels 14. The bearing block 20 is described in greater detail below.

Figure 4:
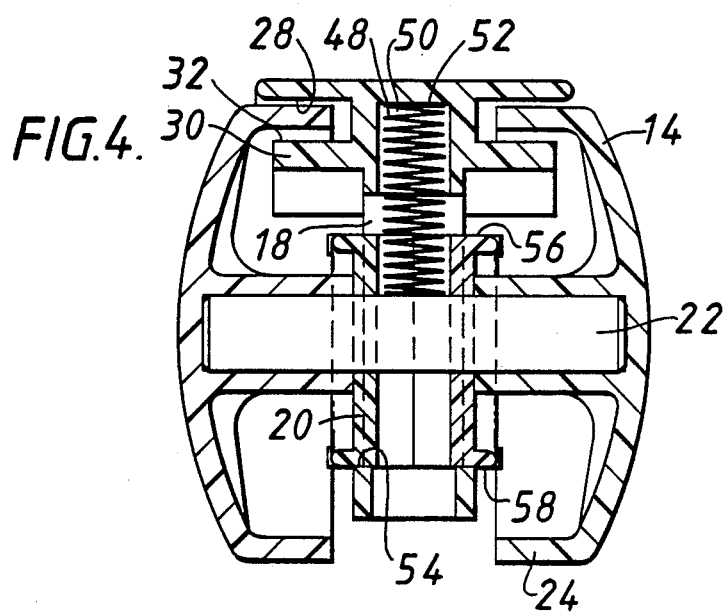
FIG. 4 is a section taken along the line IV—IV in FIG. 2 further showing the relation between the castor body and the castor wheel with the parts of the castor assembled in the first relative orientation.

As shown in FIG. 4, the castor wheels 14 are mounted on a wheel axle 22. The axle 22 is supported in the bearing block 20. The wheels 14 may be fixed on the axle 22 and the axle 22 may be journalled in the bearing block 20, or the wheels 14 may be journalled on the axle 22 and the axle 22 may be fixed in the bearing block 20, or both the wheels and the axle may be journalled. Each wheel 14 has a flanged rim 24 by which the wheel engages the ground.

Figure 3:
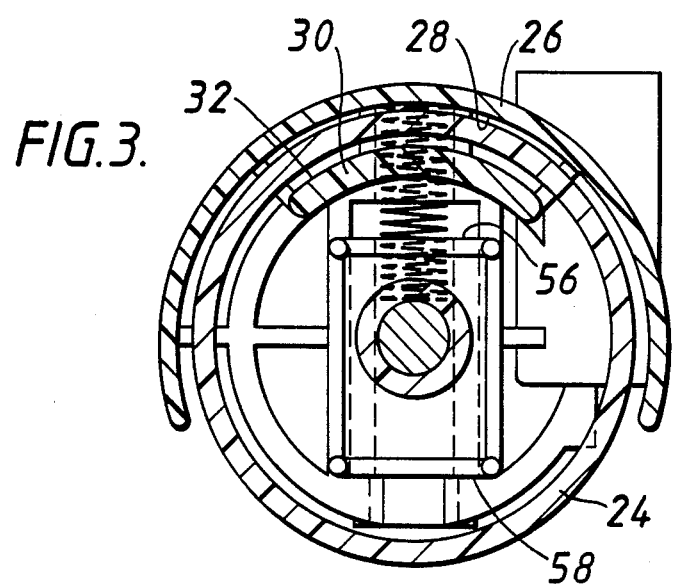
FIG. 3 is a section taken along the line III—III in FIG. 1 showing the relationship between a castor body and a castor wheel of the castor when the parts of the castor are assembled in a first relative orientation.

The castor body 12 further includes a protective cover 26 which extends in an arc around a little more than half of the circumference of the castor wheels 14 as illustrated in FIG. 3. The undersurface of the cover 26 constitutes a first braking surface 28. Facing the cover 26 on each side of a central plane of the castor are two arcuate elements 30 and the upper surface of each of these elements 30 constitutes a second braking surface 32. The flanged rim 24 of each wheel 14 is disposed between the cover 26 and a respective one of the arcuate elements 30.

The mounting of the castor wheels 14 relative to the castor body 12 will now be described further, with reference to FIGS. 3, 4, 7 and 8.

Figure 7:
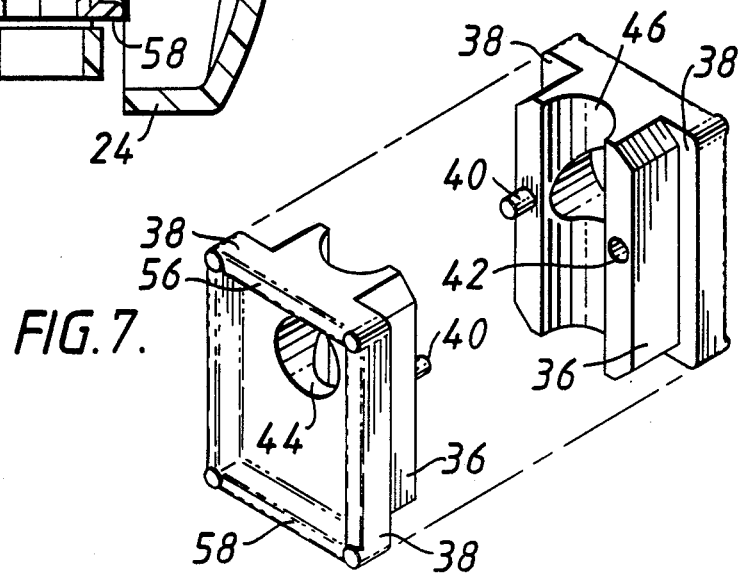
FIG. 7 is an exploded view of a bearing block of the castor.

The cavity 18 within the castor body 12 is rectangular and extends through a central section 34 of the body 12. The bearing block 20 is also rectangular, as shown in FIG. 7, and comprises two identical halves 36, which are formed with flanges 38 and with pins 40 engageable within recesses 42 to join the two halves 36 together. The two halves 36 can be assembled together within the cavity 18 of the castor body 12 and, in this condition, the flanges 38 of the bearing block 20 engage the central section 34 of the castor body 12 to retain the bearing block in place. The cavity 18 is somewhat longer than the bearing block 20 and the castor body 12 is thus vertically movable relative to the bearing block 20 within limits defined by the length of the cavity.

The wheel axle 22 passes through a horizontal bore 44 in the bearing block 20 and a vertical bore 46 is also provided to receive a spring 48. The spring 48 is further received in a bore 50 in the castor body 12 and acts between an end face 52 of the bore 50 and the wheel axle 24 to bias the body upwardly relative to the axle and the bearing block 20.

In the relative orientation of the parts illustrated in FIGS. 3 and 4, the spring 48 biasses the body upwardly so that the bearing block 20 abuts against a lower end wall 54 of the cavity 18 within the castor body 12, which then acts as a stop limiting upward movement of the body relative to the bearing block 20. In this condition, the wheel rims 24 are spaced from both braking surfaces 28, 32 and the castor wheels 14 are freely rotatable.

Figure 5:
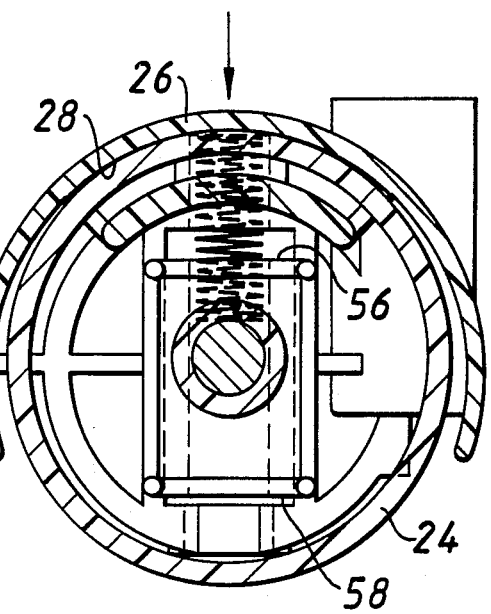
FIG. 5 is a view similar to FIG. 3 but showing the effect of a load applied to the castor.
Figure 6:
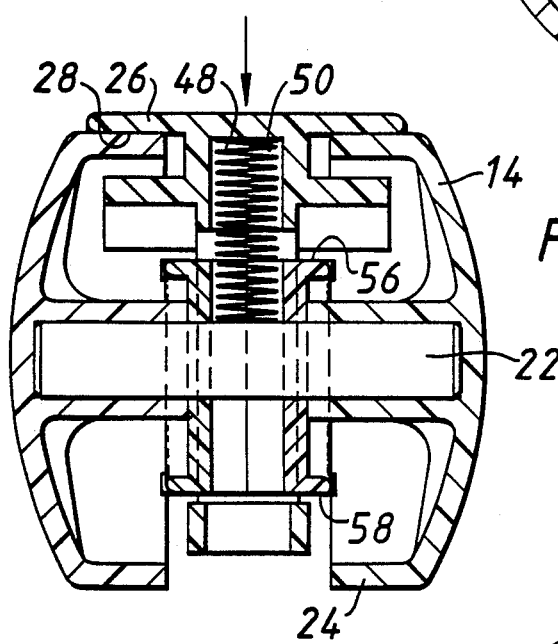
FIG. 6 is a view similar to FIG. 4 showing the effect of the load applied to the castor.

However, when a load is applied to the castor as illustrated in FIGS. 5 and 6, the spring 48 yields, allowing the body to curve downwardly so that the wheel rims 24 engage the braking surface 28. The castor 10 is thus braked in response to a load applied thereto.

It will be noticed from FIG. 7 that the horizontal bore 44 within the bearing block 20 is offset relative to the centre of the bearing block. Consequently, the distance from the bore 44 to one end 56 of the bearing block 20 is less than the distance from the bore 44 to the other end 58 of the bearing block 20. In the arrangement shown in FIGS. 3 to 6, the bearing block is orientated so that the bore 44 is closer to the upper end 56 of the block and further from the lower end 58, and the action of the spring normally biases the body upwardly so that the lower end 58 of the block abuts the lower end wall 54 of the cavity 18.

Turning to FIGS. 9 to 12, however, an alternative arrangement is illustrated. In this arrangement, the bearing block 20 is mounted within the cavity 18 such that the bore 44 is closer to the lower end 56 of the block and further from the upper end 58 of the block. The spring 48, acting between the wheel axle 22 and the end face 52 of the bore 50 in the castor body 12, biasses the body until the wheel rims 24 engage the braking surfaces 32 (see FIGS. 9 and 10). This is possible because of the gap formed between the lower end 56 of the block and the lower end wall 54 of the cavity. The castor is thus normally in a braked condition when it is not loaded, if the bearing block is oriented as shown in FIGS. 9 to 12.

Figure 11:
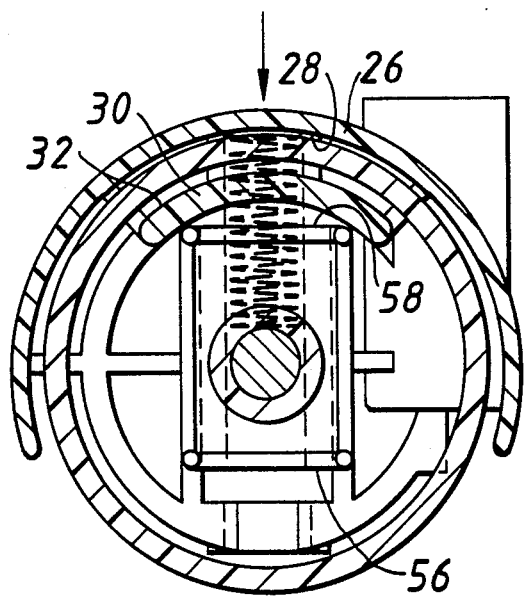
FIG. 11 is a view similar to FIG. 9 but showing the effect of a load applied to the castor.
Figure 12:
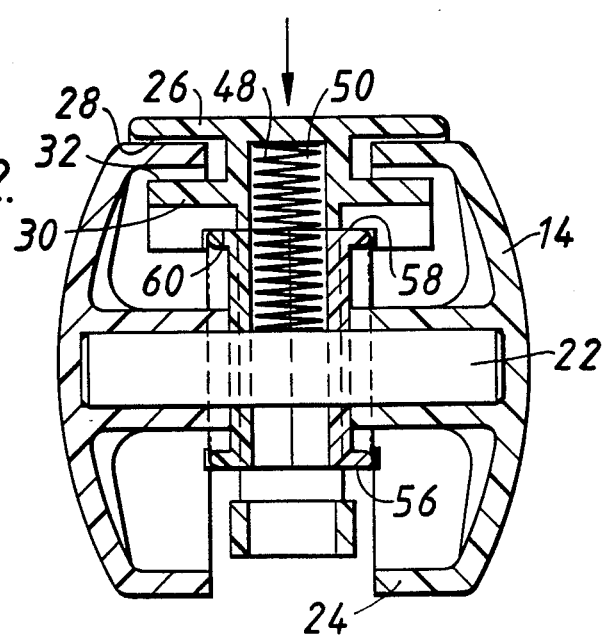
FIG. 12 is a view similar to FIG. 10 showing the effect of the load applied to the castor.

However, when a load is applied to the castor, as shown in FIGS. 11 and 12, the spring 48 yields allowing the body to move downwardly so that braking surfaces 32 move downwardly and out of contact with the wheel rims 24. This downward movement of the body is limited by the engagement of the upper end 58 of the block with an upper end wall 60 of the cavity, thus limiting the travel of the wheel rims 24 relative to the braking surfaces 32 to a position wherein the castor wheels 14 are freely rotatable.

It is apparent from the above description that the orientation of the bearing block 20 within the cavity 18 determines whether the castor wheel 14 is normally freely rotatable and is only braked in response to a load applied to the castor or whether the castor wheel is normally braked and is only rendered freely rotatable by a load applied to the castor. The two options can thus be obtained selectively using the same parts, which is beneficial from a manufacturing standpoint.

Various modifications are possible to the described embodiment.

For example, each arcuate element 30 of the castor body 12 could be extended round in a full circle and the wheel rims 24 could be engageable with the lowermost portions of the elements, rather than with the surface 28 of the cover 26, for braking purposes when the parts are oriented as shown in FIGS. 3 to 6 and a load is applied to the castor.

Further, the rectangular cavity within the castor body 12 might be replaced with a cruciform cavity arranged such that location of the bearing block 20 within a horizontal section of the cavity 18 fixes the castor body 12 against displacement relative to the block and locates the castor wheels 14 relative to the castor body 12 such that the wheels are freely rotatable at all times irrespective of whether or not a load is applied to the castor. This arrangement has the advantage that three options are available for the operation of the castor, according to the assembly of its components.

I claim:

1. A castor having a castor body, a castor wheel mounted on the body, and braking means by which the castor wheel can be selectively braked without manual actuation of said braking means either in response to the application of a load applied to the castor or in response to the absence of such a load.

2. A castor according to claim 1, wherein the means by which the castor wheel can be selectively braked comprises braking means which can be assembled selectively in either a first position relative to the other parts of the castor or a second position relative to the other parts of the castor and which, in the first position, cause or permit the castor wheel to be braked in response to the application of a load applied to the castor and, in the second position, cause or permit the castor wheel to be braked in response to the absence of such a load.

3. A castor according to claim 2, wherein the means which can be selectively assembled comprise a bearing block for supporting the castor wheel relative to the castor body, which bearing block is mountable selectively in either a first orientation or a second orientation relative to the castor body.

4. A castor according to claim 3, wherein the bearing block is arranged, in the first orientation, to permit relative movement between the castor body and the castor wheel from a first condition in which the castor wheel is freely rotatable to a second condition in which the castor wheel is braked by a first braking surface portion of the castor body and, in the second orientation, to permit relative movement between the castor body and the castor wheel from a first condition in which the castor wheel is braked by a second braking surface portion of the castor body to a second condition in which the castor wheel is freely rotatable.

5. A castor according to claim 3, wherein the bearing block supports an axle of the castor wheel in a bore therein, and wherein the bore is offset relative to the centre of the bearing block.

6. A castor according to claim 3, wherein the bearing block is receivable in a cavity within the castor body and wherein the cavity is sized to permit relative movement between the castor body and the bearing block.

7. A castor according to claim 6, wherein the extent of the relative movement between the castor body and the bearing block is limited in dependence upon the orientation of the bearing block within the cavity.

8. A castor according to claim 6, wherein the direction of the relative movement between the castor body and the bearing block is limited in dependence upon the orientation of the bearing block within the cavity.

9. A castor according to claim 3, further comprising resilient biasing means arranged to act between the castor body and the castor wheel.

10. A castor according to claim 4, wherein the first and second braking surface portions of the cast-or body comprise surfaces on opposed elements of the castor body.

11. A castor according to claim 10, wherein a rim of the castor wheel is disposed between the opposed elements.

12. A castor having a castor body and a castor wheel arranged to co-operate when the parts of the castor are assembled in a first relative orientation, such that the castor wheel is resiliently biased away from a first braking surface portion of the castor body and is engageable with the first braking surface portion in response to a load applied to the castor and, when the parts of the castor are assembled in a second relative orientation, such that the castor wheel is resiliently biased against a second braking surface portion of the castor body and is releasable from the second braking surface portion in response to a load applied to the castor.

* * * * *